United States Patent [19]

Taniguchi

[11] 4,087,011
[45] May 2, 1978

[54] SYSTEM FOR AUTOMATICALLY TRANSFERRING CARBON ELECTRODES FROM A DRYING PALETTE ONTO A PITCH IMPREGNATION PALETTE

[75] Inventor: Toru Taniguchi, Kyoto, Japan

[73] Assignee: Nikku Industry Co., Ltd., Japan

[21] Appl. No.: 760,501

[22] Filed: Jan. 19, 1977

[30] Foreign Application Priority Data

Mar. 19, 1976 Japan .............................. 51-030691

[51] Int. Cl.² .......................................... B65G 67/00
[52] U.S. Cl. .................................... 214/152; 118/503
[58] Field of Search ................... 432/1, 5; 427/385 R; 118/500, 503, 58-69, 423; 214/152, 6 P, 41, 38 CA; 266/120

[56] References Cited

U.S. PATENT DOCUMENTS

| 3,081,884 | 3/1963 | Minty | 214/38 CA X |
| 3,412,874 | 11/1968 | Shiffer | 214/6 A |
| 3,499,560 | 3/1970 | Le Gros | 214/6 P |

Primary Examiner—Albert J. Makay

Attorney, Agent, or Firm—Armstrong, Nikaido, Marmelstein & Kubovcik

[57] ABSTRACT

In order to improve mechanical and electric characteristics of carbon electrodes, they are impregnated with pitch. This impregnation operation can be accomplished at high efficiency by loading a plurality of electrodes on a specific pallet. However, when the carbon electrode-loaded pallet is dipped in an impregnation vessel, pitch adheres to the pallet, and if such pitch-adhering pallet loading fresh carbon electrodes thereon is introduced again into a pre-heating furnace prior to the impregnation operation, the pre-heating furnace is contaminated with pitch and there is a risk of a fire. In order to avoid this disadvantage, there is adopted a method in which different pallets are used for introducing carbon electrodes into the pre-heating furnace and for introducing them into the impregnation vessel, respectively. In this method, the operation of shifting carbon electrodes from one pallet to another pallet is necessary. In this invention, a specific shifting method is adopted for preventing carbon electrodes from being damaged or broken during the shifting operation.

1 Claim, 3 Drawing Figures

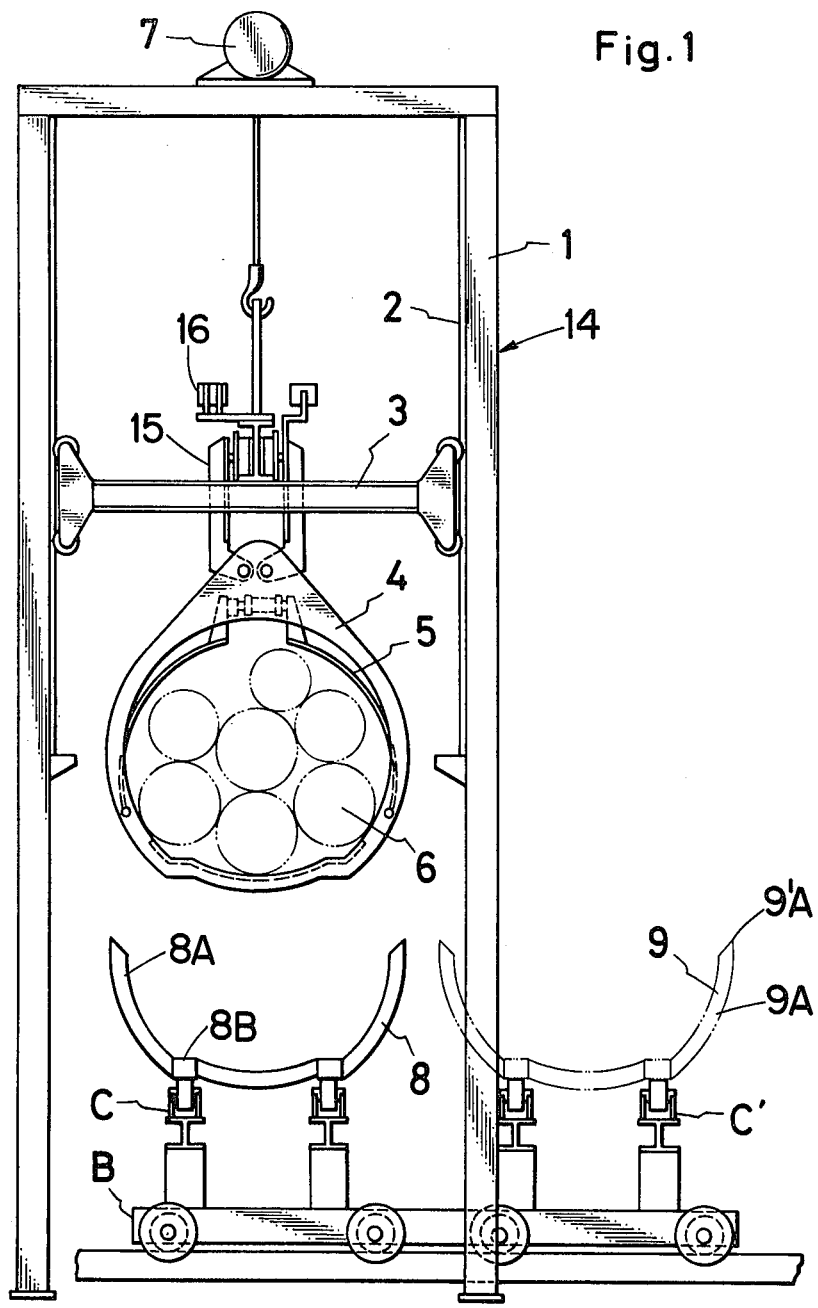

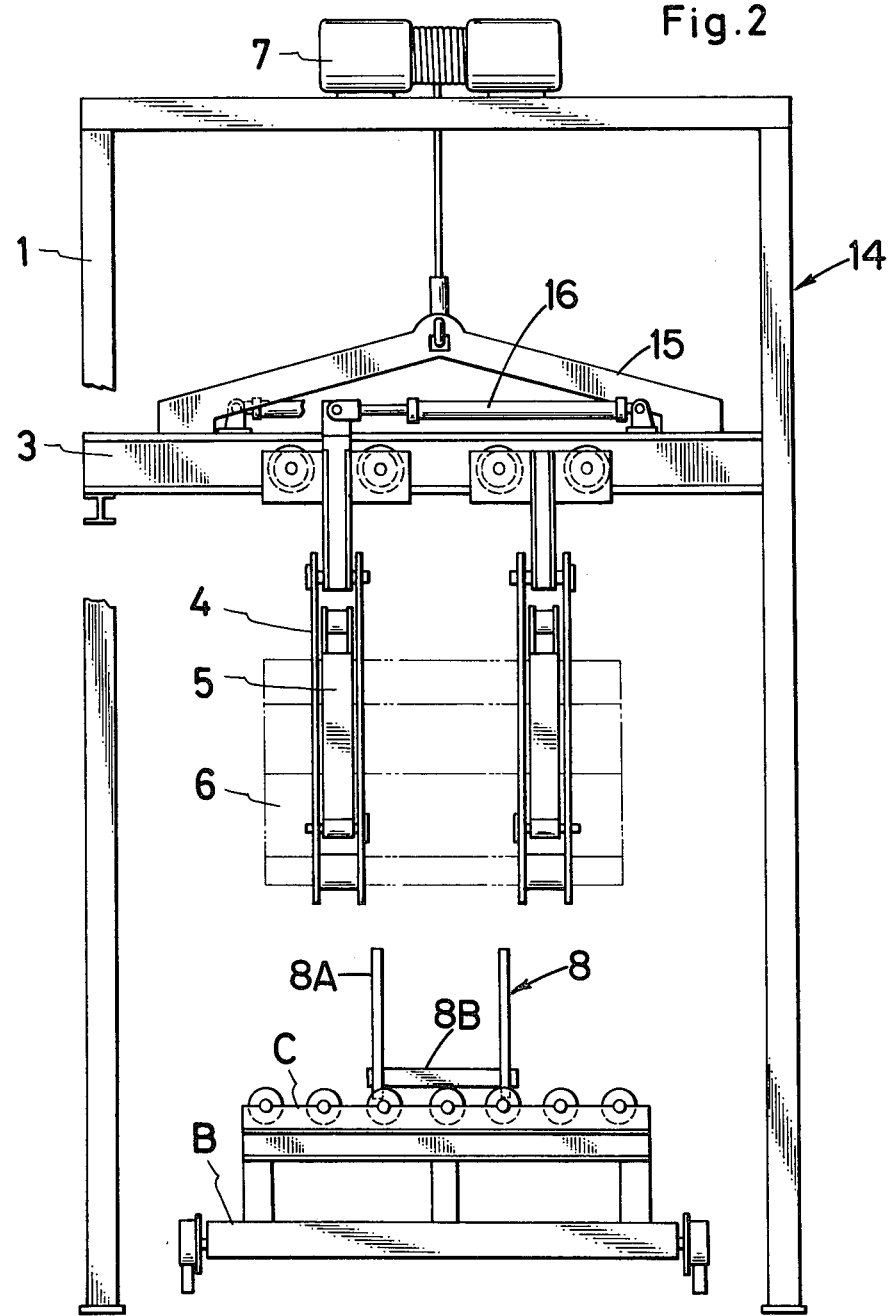

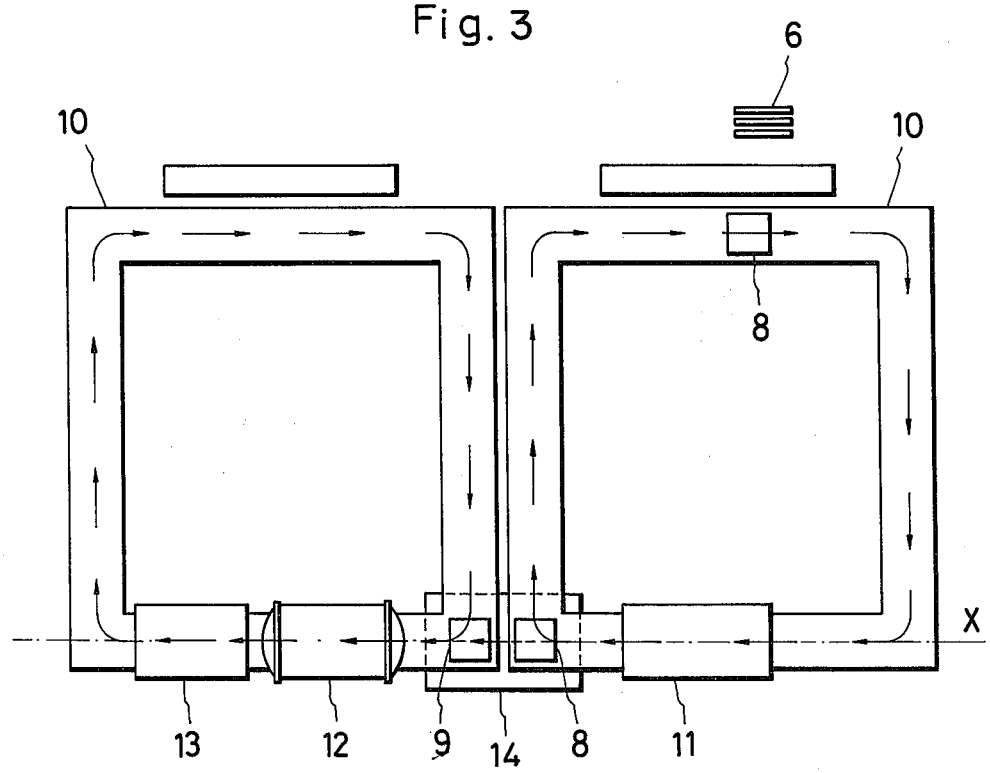

SYSTEM FOR AUTOMATICALLY TRANSFERRING CARBON ELECTRODES FROM A DRYING PALETTE ONTO A PITCH IMPREGNATION PALETTE

BACKGROUND OF INVENTION

The present invention relates to a system transferring carbon electrodes from a drying pallet onto a pitch impregnation pallet, which system has been developed for efficiently carrying out an improved invention of a cyclic operation of carbon electrode impregnation operating line.

Heretofore, in order to carrying out a vacuum pressure impregnation of pitch into carbon electrode, carbon electrodes are placed on a pallet, and put into a drying furnace, and after the heating and drying thereof, the electrodes are put into an impregnation tank, and after pumping out the air pumping out and degasing, molten pitch is poured therein and thereafter the electrodes are pressure impregnated with the pitch, and after the completion of the impregnation, they are rapidly cooled. However, in such method, there are drawbacks that when a palette having sticked pitch gets in the drying furnace, the pitch is heated at a high temperature and thereby become molten and flows down, with the result of contamination of the hot blast by pitch gas, deterioration of the working environment and an increase in public injury, causing fires of drying furnace and causing problems with the pallet transporting mechanism within the drying furnace. Also since the carbonization layer grows on the surface of the pallet, considerable time and effort are required for cleaning of the parts, resulting in a substantial decrease of the productivity.

By the technical progress made after development of this impregnation method, the impregnation procedures have been improved and at the present there is adopted a method in which a plurality of carbon electrodes are collectively loaded on a pallet having a specific shape and configuration and they are dipped in molten pitch in the loaded state. This impregnation operation is ordinarily conducted according to a process shown in the flow chart of FIG. 3. Referring to FIG. 3, a plurality of carbon electrodes are loaded on a pallet 8 (of which the shape and configuration are illustrated in FIGS. 1 and 2), and the pallet 8 is placed on transporting means 10 such as a conveyor and is first passed through a drying oven 11. In this drying oven 11, the carbon electrodes are pre-heated so that when the carbon electrodes are dipped in molten pitch in an impregnation vessel described hereinafter and while the voids in the carbon electrodes are impregnated with molten pitch, cooling and solidification of the impregnated pitch can be prevented. Accordingly, the drying oven 11 is disposed to pre-heat the carbon electrodes rather than to dry them.

The dried or pre-heated carbon electrodes 6 are brought down from the pallet 8 and shifted to another pallet 9, and the carbon electrodes 6 loaded on the pallet 9 are fed to an impregnation vessel 12 disposed on the same axial line X as that of the drying oven 11, where the carbon electrodes are impregnated with molten pitch. Then, the carbon electrodes 6 are passed through a cooling vessel 13 and brought down from the pallet. Thus, one cycle of the operation of impregnation of carbon electrodes is completed.

In the above illustrated process, it is apparently necessary to shift carbon electrodes loaded on the pallet 8 to another pallet 9. The reasons will now be described in detail.

The pallet 9 loading carbon electrodes thereon is dipped in molten pitch in the impregnation vessel 12 together with the carbon electrodes, and therefore, the pallet 9 is contaminated with pitch. If fresh carbon electrodes are loaded on such contaminated pallet 9 and they are passed through the drying oven 11, pitch which has adhered to the pallet 9 and been solidified thereon is molten and then gasified, while contaminating the drying oven 11 and its surrounding embodiment, and in some case, a fire is caused.

In order to avoid this disadvantage, it is necessary to use different pallets for passing carbon electrodes through the impregnation vessel 12 and for passing them through the drying oven, respectively, and it also is necessary to shift carbon electrodes from one pallet to another pallet.

Prior to passage through the impregnation vessel 12, carbon electrodes which have passed through the drying oven 11 are shifted from the pallet 8 used for passage through the drying oven 11 (hereinafter referred to as "drying pallet") to another pallet 9 to be used for passage through the impregnation vessel 12 (hereinafter referred to as "impregnating pallet"). In FIG. 1, the apparatus for performing this shifting operation is indicated by reference numeral 14.

Accordingly, a drying pallet and a pitch impregnation pallet are provided separately, and the carbon electrodes are transferred from one pallet to the other pallet in order to solve the drawbacks. However, as the method of transferring the carbon electrodes, there are many methods such as the use of a forklift etc., but after all, a full automatic system has.

SUMMARY OF THE INVENTION

It is a primary object of the present invention to provide a method in which hot carbon electrodes loaded on a drying pallet can be shifted in a short time to an impregnated pallet without being damaged or broken.

In accordance with the present invention, the foregoing object can be attained by a method for loading a plurality of carbon electrodes on one pallet, passing the carbon electrodes in the state loaded on the pallet through a drying oven and shifting the resulting hot carbon electrodes to another pallet, said method comprising loading a plurality of carbon electrodes on a drying pallet of the roller type including at least two carbon electrode supports having a U-shaped section, the spacing between the two supports being shorter than the length of the carbon electrodes, passing the carbon electrodes loaded on said drying pallet through the drying oven, inserting both the ends of each of the carbon electrode-hanging frame fixtures having an O-figures shape, respectively, lifting up said two fixtures to thereby hold the the carbon electrodes in a bundle-like form, displacing the empty pallet from which the carbon electrodes have been raised up, from a position just below the raised carbon electrodes, locating at said position an impregnating pallet for loading carbon electrodes thereon and feeding them to an impregnation vessel, and lowering the raised carbon electrodes into said impregnating pallet in a bundle-like form.

The invention will be described in detail hereinafter with reference to the drawings showing an embodiment of the present invention.

BRIEF EXPLANATION OF DRAWINGS

FIG. 1 is a front view showing a transfer system wherein the impregnation is carried out in one palette at a time;

FIG. 2 is a side view showing the transfer system with carbon electrodes lifted up, viewed in the moving direction of a transversing truck B.

FIG. 3 illustrates the overall view of a carbon electrode impregnation system with which the present invention is used.

DETAILED DESCRIPTION OF THE PREFERRED EMBODIMENT

Carbon electrodes are first loaded on a drying pallet 8. It may be considered that loading of carbon electrodes on the drying pallet will not be particularly relevant to the shifting method to which the present invention is directed. However, in order to perform the shifting operation effectively according to the present invention, it is necessary to adopt a specific pallet as the drying pallet. Accordingly, the operation of loading carbon electrodes 6 on such specific drying pallet will first be described.

The front and side of the drying pallet 8 that is used in the present invention are illustrated in FIGS. 1 and 2 respectively, together with other members. As will be apparent from FIGS. 1 and 2, the drying pallet 8 is a pallet of the roller type having at least 2 carbon electrode supports 8A having a U-shaped section (see FIG. 1). The two supports 8A are connected to each other in the middle portions thereof by a roller spacer 8B. The manner of attaching the spacer 8B will readily be seen from FIG. 2. The distance or spacing 1 between two outer carbon electrode supports is smaller than the length L of the carbon electrodes 6. This relation is clearly shown in FIG. 2.

Then, the pallet 8 carrying the carbon electrodes 6 thereon is passed through a drying oven 11 and the pallet 8 carrying the hot carbon electrodes 6 thereon is moved just below a shifting device 14. Any of devices can be used as the shifting device so far as it can lift up carbon electrodes 6 on the drying pallet 8 collectively in a bundle-like form from the drying pallet 8. However, it is important that the two lifting frame fixtures which are mounted on the shifting device 14 are capable of having both the ends of each of the carbon electrodes 6 inserted therethrough, should be mounted on the shifting device 14.

This shifting device is illustrated in FIGS. 1 and 2. More specifically, the shifting device 14 includes a frame 1 constituting the body portion of the device, a hoist 7 attached to the top end portion of the frame 1, a hanger 15 suspended from said hoist 7, a beam 3 attached to said hanger 15 and being capable of being moved in the vertical direction and in the horizontal directon, two O-shaped hanging-up frame fixtures 4 suspended from said beam 3 and being capable of being moved in the horizontal direction by a hydraulic cylinder 16 attached to said beam 3 and a clamping fixture for clamping the hung-up carbon electrodes 6. A horizontally travelling carriage B loading thereon a relay roller conveyor C for receiving the drying pallet thereon is disposed below the shifting device 14.

By using the shifting device 14, roller conveyor C, horizontally travelling carriage B and drying and impregnating pallets 8 and 9, the operation of shifting electrodes is conducted in the following manner.

The hoist is moved to a position parallel to the carbon electrodes 6 on the drying pallet 8 and spaced from both the ends of the carbon electrodes 6, and simultaneously, the hydraulic cylinder 16 is operated to lift up the frame fixture 5. Then, the bundle of the carbon electrodes is inserted into the O-shaped lifting-up frame fixtures 4. The foregoing operations are accomplished by two hydraulic cylinders 16. Accordingly, two lifting frame fixtures 4 are moved so that they are brought close to each other. Then, the clamping fixture 5 is mildly operated to prevent the carbon electrodes 6 from moving in the horizontal direction. The, the hoist 7 is moved to lift up the carbon electrodes 6 from the drying pallet 8. The empty drying pallet 8 is displaced from the position X where it has been located. This displacement of the drying pallet 8 is accomplished by the horizontally travelling carriage B. Instead, the impregnating pallet 9 is located at this position X. This operation is accomplished also by the movement of the horizontally travelling carriage B.

Then, the carbon electrodes 6 are brought down on the impregnating pallet 9 and loaded on the impregnating pallet 9. This is accomplished by an operation reverse to the above operation of lifting the carbon electrodes 6 from the drying pallet 8.

By repeating the foregoing procedures, carbon electrodes can be shifted from one group of pallets 8 to another group of pallets 9 smoothly in a continuous manner.

When the operation of shifting the carbon electrodes is thus completed, the pallet 9 loading thereon the carbon electrodes 6 is fed to the impregnation vessel.

In lifting up a bundle of carbon electrodes, it has been a common technique to clutch the carbon electrodes and hang them up. However, in the present invention, a bundle of carbon electrodes is lifted up in such a manner as to prevent movement therebetween. Accordingly, in the present invention, the carbon electrodes can be effectively prevented from being damaged by the shifting operation. Moreover, in the present invention, since the carbon electrodes in the lifted state are prevented from being moved in a direction other than the vertical direction, breakage of the bundle-like arrangement of the carbon electrodes can be prevented while the carbon electrodes are moved up and down, and also the carbon electrodes can be prevented from swinging to and fro and hitting on other objects.

As will be apparent to those skilled in the art, the above-mentioned method of the present invention can be accomplished automatically by utilizing an appropriate automatic control system.

What is claimed is:

1. In the method for loading a plurality of carbon electrodes on one pallet, passing the carbon electrodes on a pallet through a drying oven and shifting the resulting hot carbon electrodes to another pallet, an improvement comprising loading a plurality of carbon electrodes on a drying pallet of a roller type including at least two U-shaped carbon electrode supports, the spacing between two supports being shorter than the length of the carbon electrodes, passing the carbon electrodes loaded on said pallet through the drying oven, inserting both the ends of each of the carbon electrodes into two carbon electrode-lifting frame fixtures having an O-figured shape, lifting up said two fixtures to thereby lift the carbon electrodes in a bundle-like form, displacing the empty pallet from which the carbon electrodes have been raised, from a position just below the raised carbon electrodes, locating at said position an impregnating pallet for loading carbon electrodes thereon and feeding them to an impregnation vessel, and lowering the raised carbon electrodes onto said impregnating pallet in a bundle-like form.

* * * * *